US011654926B2

(12) United States Patent
Davidovich et al.

(10) Patent No.: US 11,654,926 B2
(45) Date of Patent: May 23, 2023

(54) SECURE SYSTEM THAT INCLUDES AN OPEN SOURCE OPERATING SYSTEM

(71) Applicant: Mobileye Vision Technologies Ltd., Jerusalem (IL)

(72) Inventors: Refael Davidovich, Modiin (IL); Elya Gurvitz, Eli (IL); Simone Fabris, Tel Aviv (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 530 days.

(21) Appl. No.: 16/823,104

(22) Filed: Mar. 18, 2020

(65) Prior Publication Data
US 2020/0298870 A1 Sep. 24, 2020

Related U.S. Application Data

(60) Provisional application No. 62/819,709, filed on Mar. 18, 2019.

(51) Int. Cl.
*H04L 12/40* (2006.01)
*H04L 12/46* (2006.01)
*G06F 9/445* (2018.01)
*G06F 9/455* (2018.01)
*B60W 50/02* (2012.01)

(52) U.S. Cl.
CPC ..... *B60W 50/0205* (2013.01); *G06F 9/45558* (2013.01); *B60W 2050/021* (2013.01); *G06F 2009/45587* (2013.01); *G06F 2009/45591* (2013.01)

(58) Field of Classification Search
CPC ....... B60W 50/0205; B60W 2050/021; B60W 50/00; B60W 30/0956; B60W 50/02; B60W 30/09; G06F 9/45558; G06F 2009/45587; G06F 2009/45591; G06F 9/4418; G06F 9/45541; G06F 9/5077; G06F 13/107; B60R 16/03; G05D 1/0214
See application file for complete search history.

(56) References Cited

U.S. PATENT DOCUMENTS

| 10,382,221 | B2 * | 8/2019 | Han | H04L 69/26 |
|---|---|---|---|---|
| 2011/0238861 | A1 * | 9/2011 | Hutchinson | G06F 9/54 |
| | | | | 719/314 |
| 2012/0166626 | A1 * | 6/2012 | Rai | H04L 12/6418 |
| | | | | 709/224 |

(Continued)

OTHER PUBLICATIONS

Xie et al., Minimizing Development Cost With Reliability Goal for Automotive Functional Safety During Design Phase, 16 pages (Year: 2017).*

*Primary Examiner* — Thuy Dao
(74) *Attorney, Agent, or Firm* — Schwegman Lundberg & Woessner, P.A.

(57) ABSTRACT

A method of implementing safety mechanisms in a safety-critical system, the method comprising: receiving, at a safety mechanism configured to provide a first level of safety, a message or command from a calling process operating at second level of safety, the first level of safety having more restrictive requirements than the second level of safety; and initiating by the safety mechanism, a resultant process based on the message or command, the resultant process configured to operate at the first level of safety.

20 Claims, 12 Drawing Sheets

(56) References Cited

U.S. PATENT DOCUMENTS

| | | | |
|---|---|---|---|
| 2015/0185732 A1* | 7/2015 | Debouk | B60W 50/02 |
| | | | 701/23 |
| 2015/0261704 A1* | 9/2015 | Vaccaro | G06F 13/364 |
| | | | 710/114 |
| 2017/0036677 A1* | 2/2017 | Blumentritt | B60L 7/18 |
| 2017/0063853 A1* | 3/2017 | Lim | H04L 9/3242 |
| 2017/0085437 A1* | 3/2017 | Condeixa | H04L 43/06 |
| 2018/0208060 A1* | 7/2018 | Kim | B60K 35/00 |
| 2018/0308202 A1* | 10/2018 | Appu | G06N 3/063 |
| 2019/0018408 A1* | 1/2019 | Gulati | G08G 1/09623 |
| 2020/0013281 A1* | 1/2020 | Eriksson | G08G 1/164 |
| 2020/0250301 A1* | 8/2020 | Klein | H04L 12/40 |

* cited by examiner

SECURE SYSTEM THAT INCLUDES AN OPEN SOURCE OPERATING SYSTEM

PRIORITY

This application claims the benefit of priority to U.S. Provisional Patent Application Ser. No. 62/819,709, filed Mar. 18, 2019, which is incorporated by reference herein in its entirety.

BACKGROUND

Automotive Safety Integrity Levels (ASIL) refers to a classification of inherent safety risk in an automotive system or elements of such a system. ASIL classifications (levels) are used within ISO 26262 to express the level of risk reduction required to prevent a specific hazard.

Electronic Control Units (ECUs) have been used for many years in safety critical applications in different domains (e.g. medical, automotive). The traditional ECU may have one or more processors, but each processor executes a single application. In various advanced ECUs, multiple instances of a single application have run on a multicore central processing unit (CPU). In these models, the different functions of the system are integrated into a single application. Resource allocation is performed statically by the integrator.

The traditional approach to ECU hardware and software design is changing. Modern ECUs use advanced system on chips (SOCs) that contain multicore CPUs and accelerators. They can run multiple and diverse applications, for example, a single SOC can run computer vision tasks on sensor input and also calculate a trajectory. The software for such SOCs may be sourced from multiple vendors and may be of different ASIL levels. This implies is that modern ECU software architecture must rely on operating systems. Linux is the most popular operating system (OS).

However, Linux OS cannot be considered safe according to any safety standard of the IEC 61508 family because it is not developed according to the requirements of the safety standards. It is also a huge project with millions of lines of code and it is not possible to develop sufficiently good tests to cover the whole code base.

The Linux OS also cannot be considered for use in a safety critical system according to ISO 26262 part 8 section 8.12 (reuse of existing components) because it cannot be qualified (there are no written requirements for Linux) and because this clause is intended for small components that are imported into another component, not for a foundation component like the OS.

There is a need to provide a system that is safe enough despite the usage of Linux OS.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description may be not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as FCW, LDW and TSR, as opposed to fully autonomous driving.

Example 1 is a method comprising: determining to execute an operation by an open source operating system that has a second level of safety; checking whether a completion of the operation by the open source operating system will breach a safety requirement related to a first level of safety; wherein the first level of safety exceeds the second level of safety; and applying a safety mechanism of the first level of safety to complete the operation when determining that the completion of the operation by the open source operating system will breach the safety requirement of the first level of safety.

In Example 2, the subject matter of Example 1 includes, wherein the open source operating system is a Linux operating system.

In Example 3, the subject matter of Examples 1-2 includes, wherein the open source operating system is a Linux operating system that is modified to be ASIL QM compliant.

In Example 4, the subject matter of Examples 1-3 includes, wherein the applying of the safety mechanism comprises applying a memory domain interface safety mechanism.

In Example 5, the subject matter of Examples 1-4 includes, wherein the applying of the safety mechanism comprises applying a memory integrity protection safety mechanism.

In Example 6, the subject matter of Examples 1-5 includes, wherein the applying of the safety mechanism comprises applying a timing and execution safety mechanism.

In Example 7, the subject matter of Examples 1-6 includes, wherein the applying of the safety mechanism comprises applying a resource allocation safety mechanism.

Example 8 is a non-transitory computer readable medium that stores instructions for: determining to execute an operation by an open source operating system that has a second level of safety; checking whether a completion of the operation by the open source operating system will breach a safety requirement related to a first level of safety; wherein the first level of safety exceeds the second level of safety; and applying a safety mechanism of the first level of safety to complete the operation when determining that the completion of the operation by the open source operating system will breach the safety requirement of the first level of safety.

In Example 9, the subject matter of Example 8 includes, wherein the open source operating system is a Linux operating system.

In Example 10, the subject matter of Examples 8-9 includes, wherein the open source operating system is a Linux operating system that is modified to be ASIL QM compliant.

In Example 11, the subject matter of Examples 8-10 includes, wherein the applying of the safety mechanism comprises applying a memory domain interface safety mechanism.

In Example 12, the subject matter of Examples 8-11 includes, wherein the applying of the safety mechanism comprises applying a memory integrity protection safety mechanism.

In Example 13, the subject matter of Examples 8-12 includes, wherein the applying of the safety mechanism comprises applying a timing and execution safety mechanism.

In Example 14, the subject matter of Examples 8-13 includes, wherein the applying of the safety mechanism comprises applying a resource allocation safety mechanism.

Example 15 is a method for applying a page table safety mechanism, the method comprising: determining, by a kernel function of a Linux kernel to update a page table; invoking a hypercall; and updating the page table, by a hypervisor, in a safe manner.

Example 16 is a non-transitory computer readable medium that stores instructions for: determining, by a kernel function of a Linux kernel to update a page table; invoking a hypercall; and updating the page table, by a hypervisor, in a safe manner.

Example 17 is a method for providing a combination of an open source operating system and a safety mechanism that together are first level safety compliant, the method comprising: checking for each first level safety requirement whether the open source operating system is sufficient; and when the open source operating system is not sufficient then providing a safety mechanism that complies with the first level safety requirement.

Example 18 is a non-transitory computer readable medium that stores instructions for providing a combination of an open source operating system and a safety mechanism that together are first level safety compliant, the instructions include, instructions for: checking for each first level safety requirement whether the open source operating system is sufficient; and when the open source operating system is not sufficient then providing a safety mechanism that complies with the first level safety requirement.

Example 19 is a method of implementing safety mechanisms in a safety-critical system, the method comprising: receiving, at a safety mechanism configured to provide a first level of safety, a message or command from a calling process operating at second level of safety, the first level of safety having more restrictive requirements than the second level of safety; and initiating by the safety mechanism, a resultant process based on the message or command, the resultant process configured to operate at the first level of safety.

In Example 20, the subject matter of Example 19 includes, wherein the first level of safety is ASIL-B.

In Example 21, the subject matter of Examples 19-20 includes, wherein the second level of safety is ASIL QM.

In Example 22, the subject matter of Examples 19-21 includes, wherein the calling process operating at the second level of safety is an operating system process.

In Example 23, the subject matter of Examples 19-22 includes, wherein the calling process operating at the second level of safety is an open source operating system process.

In Example 24, the subject matter of Examples 19-23 includes, wherein the safety mechanism is configured to execute in user space.

In Example 25, the subject matter of Examples 19-24 includes, wherein the safety mechanism is configured to execute in kernel space.

In Example 26, the subject matter of Examples 19-25 includes, wherein the safety mechanism is configured to execute in a hypervisor.

In Example 27, the subject matter of Examples 19-26 includes, wherein the command is a memory operation, and wherein initiating the resultant process comprises initiating a corresponding memory operation on behalf of the calling process operating at the second level of safety.

In Example 28, the subject matter of Example 27 includes, wherein the memory operation includes a page table update, and wherein the resultant process is a hypercall to execute the page table update.

In Example 29, the subject matter of Examples 27-28 includes, wherein the memory operation includes a memory allocation operation, and wherein the resultant process is configured to: analyze the boundaries of the memory allocation operation to determine whether memory allocated would overlap existing memory allocations; and alert the calling process that the memory allocation operation would violate memory protection constraints, or cause the memory allocation operation to allocate non-overlapping memory segments.

In Example 30, the subject matter of Examples 19-29 includes, wherein the command is a request for shared resources, and wherein the resultant process is to manage timing, execution, or availability of the shared resources.

In Example 31, the subject matter of Example 30 includes, wherein the calling process is associated with a priority level or an application type, and wherein the timing, execution, or availability of the shared resources is based on the priority level or application type.

In Example 32, the subject matter of Examples 30-31 includes, wherein the shared resources include processing resources or memory resources.

In Example 33, the subject matter of Examples 30-32 includes, wherein the calling process is associated with a control group that has a priority level used to manage timing, execution, or availability of the shared resources.

In Example 34, the subject matter of Examples 30-33 includes, wherein the calling process is associated with a namespace that has a priority level used to manage timing, execution, or availability of the shared resources.

In Example 35, the subject matter of Examples 19-34 includes, wherein the message is an inter-process message, and wherein initiating the resultant process comprises adding data padding to the message.

In Example 36, the subject matter of Example 35 includes, wherein the data padding is used to identify data integrity issues with the message after it is received.

In Example 37, the subject matter of Examples 19-36 includes, wherein the message is an inter-process message, and wherein initiating the resultant process comprises enqueuing the message to a message buffer.

In Example 38, the subject matter of Example 37 includes, monitoring the message buffer to determine whether the message is ever delivered.

In Example 39, the subject matter of Example 38 includes, wherein monitoring the message buffer comprises: analyzing the message to determine a timestamp of when the message was created or written to the message buffer; obtaining a current time; and determining whether a threshold period has elapsed based on the difference between the timestamp and the current time.

In Example 40, the subject matter of Examples 19-39 includes, wherein initiating the resultant process comprises monitoring a message buffer to determine whether the message is ever received.

In Example 41, the subject matter of Example 40 includes, wherein monitoring the message buffer comprises: analyzing the message to determine a timestamp of when the message was created or written to the message buffer; obtaining a current time; and determining whether a threshold period has elapsed based on the difference between the timestamp and the current time.

In Example 42, the subject matter of Examples 40-41 includes, wherein the monitoring is performed at a detection interval.

In Example 43, the subject matter of Example 42 includes, wherein the threshold period is equal to the detection interval.

In Example 44, the subject matter of Examples 19-43 includes, wherein initiating the resultant process comprises: querying the calling process to identify a sent message; querying a receiving process to identify received messages; and determining whether the sent message was ever received by analyzing the received messages for the sent message.

In Example 45, the subject matter of Examples 19-44 includes, wherein the resultant process is a hypercall.

Example 46 is at least one machine-readable medium including instructions that, when executed by processing circuitry, cause the processing circuitry to perform operations to implement of any of Examples 1-45.

Example 47 is an apparatus comprising means to implement of any of Examples 1-45.

Example 48 is a system to implement of any of Examples 1-45.

Example 49 is a method to implement of any of Examples 1-45.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
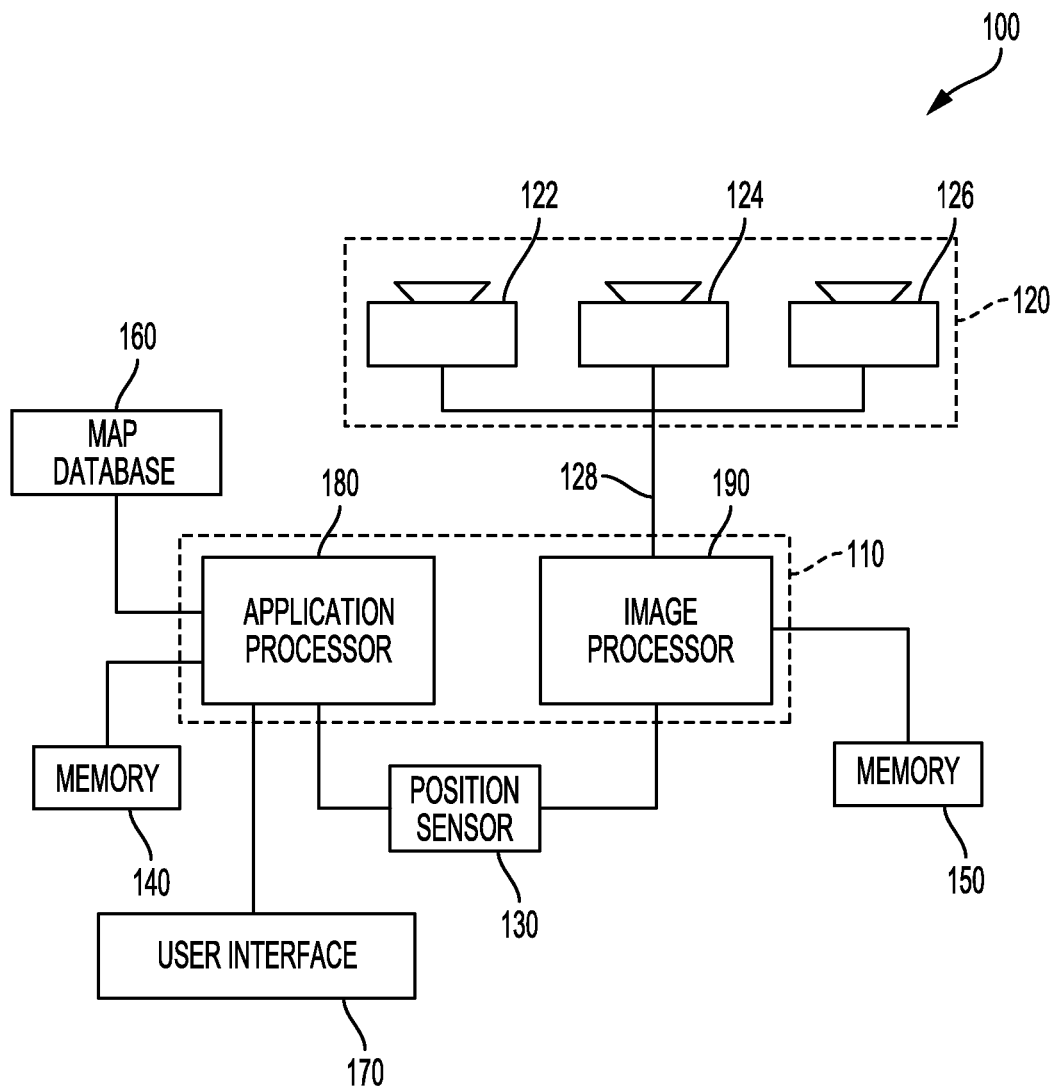
FIG. 1 is a block diagram representation of a system consistent with the disclosed embodiments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition devices and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition device 120. For example, data interface 128 can include any wired and/or wireless link or links for transmitting image data acquired by image acquisition device 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 MHz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP®, and the DMA, the second MIPS34K CPU and the multi-channel DMA as well as the other peripherals. The five VCEs, three VMP®, and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor or any further generation chip, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing and processing the imagery from the image sensors. The CPU can include any number of microcontrollers or microprocessors. The support circuits can be any number of circuits generally well known in the art, including cache, power supply, clock and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectable to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a RF sensor (e.g., radar transceiver), a LIDAR sensor. Such sensors can be used independently of or in cooperation with the image acquisition device 120. For example, the data from the radar system (not shown) can be used for validating the processed information that is received from processing images acquired by the image acquisition device 120, e.g., to filter certain false positives resulting from processing images acquired by the image acquisition device 120, or it can be combined with or otherwise compliment the image data from the image acquisition device 120, or some processed variation or derivative of the image data from the image acquisition device 120.

Figure 2A:
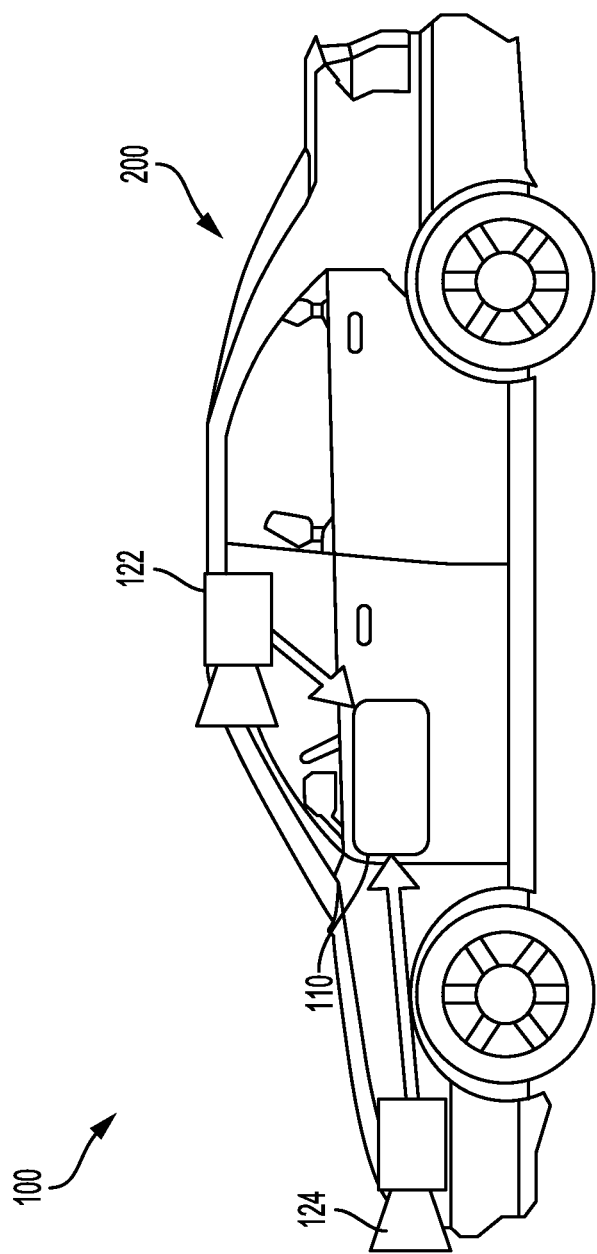
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
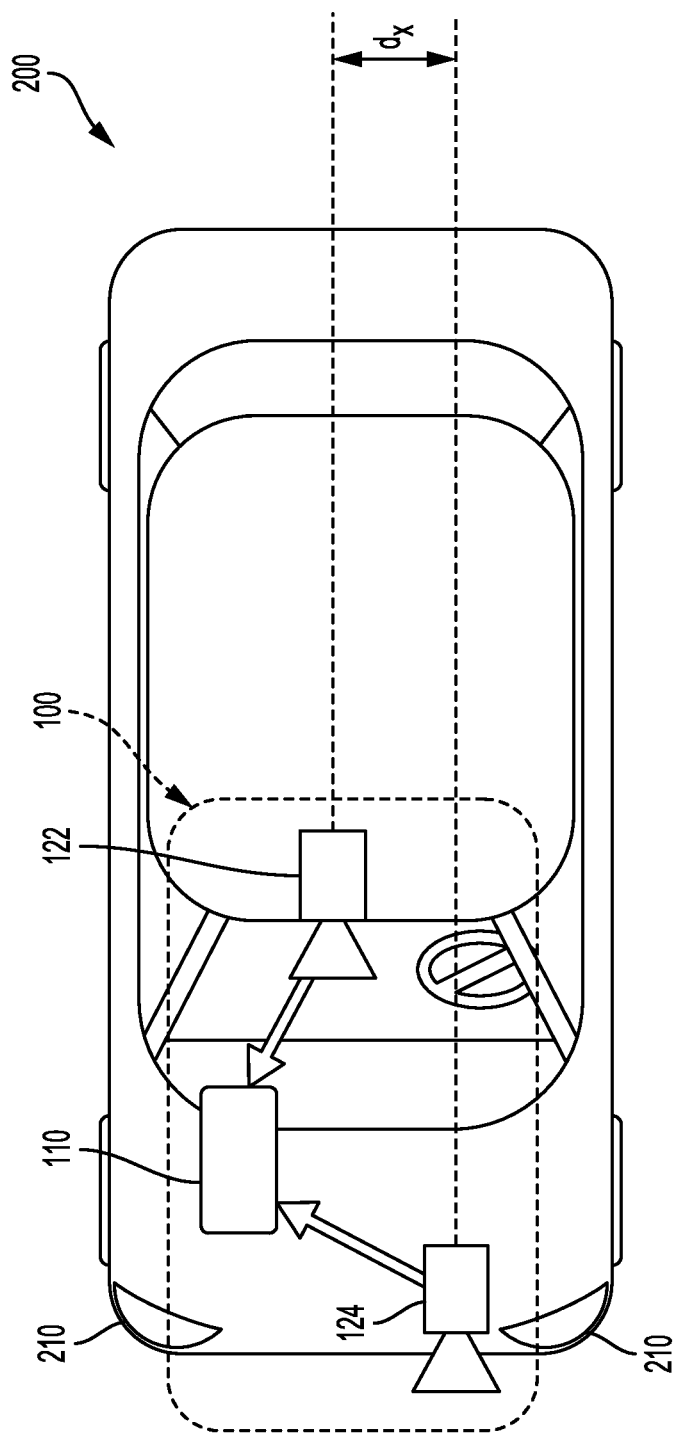
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
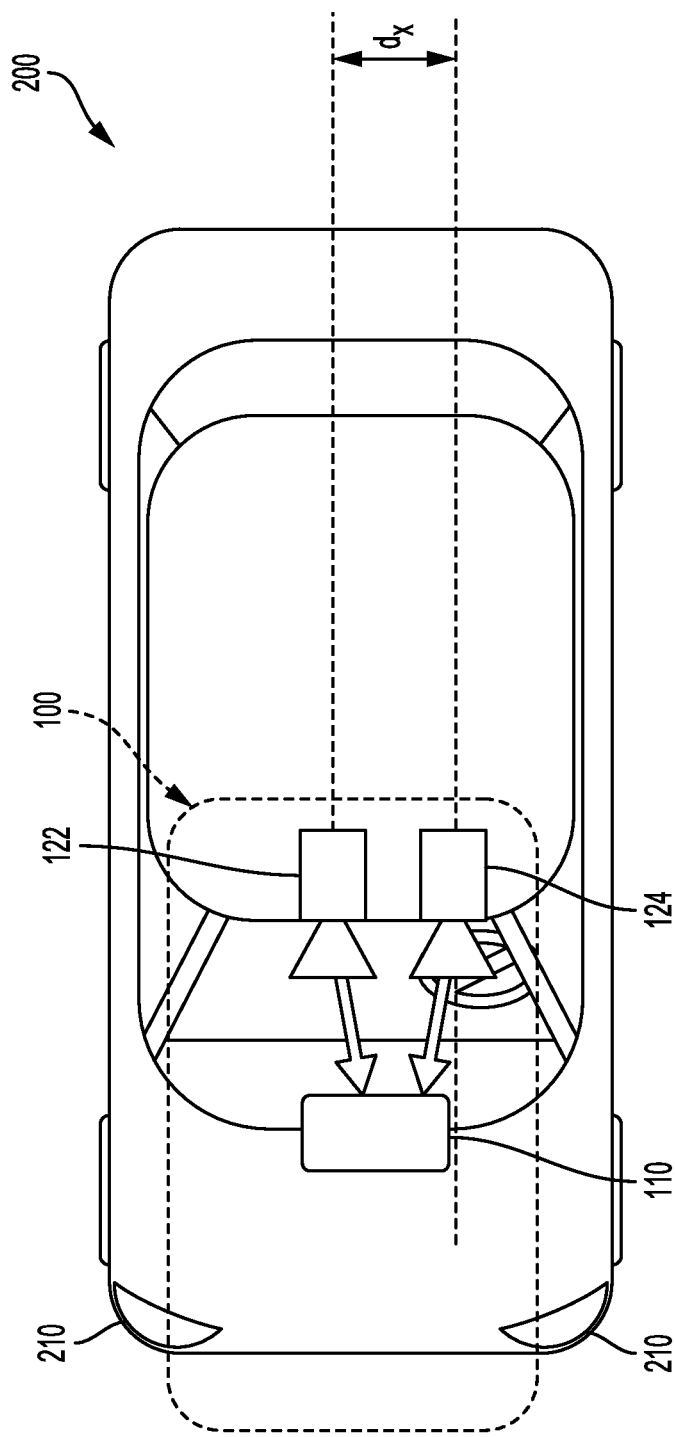
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
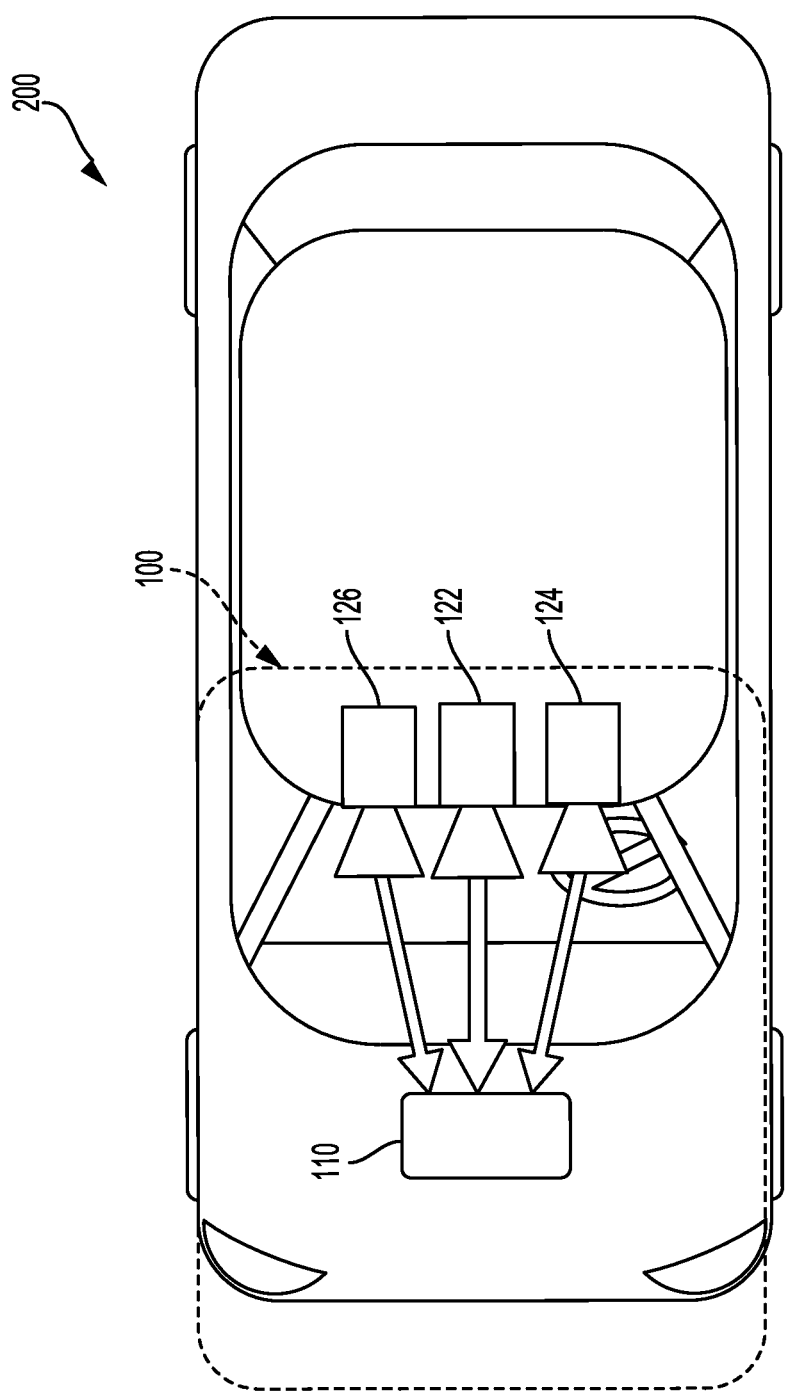
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
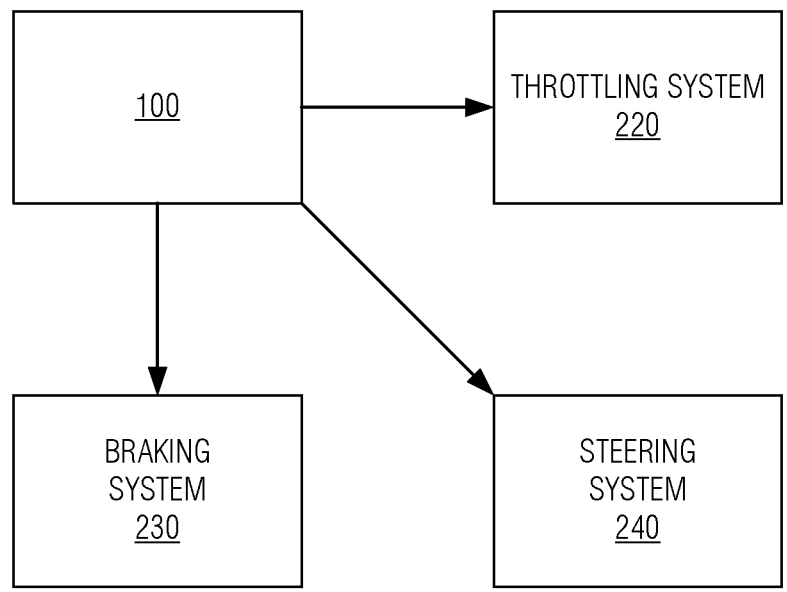
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
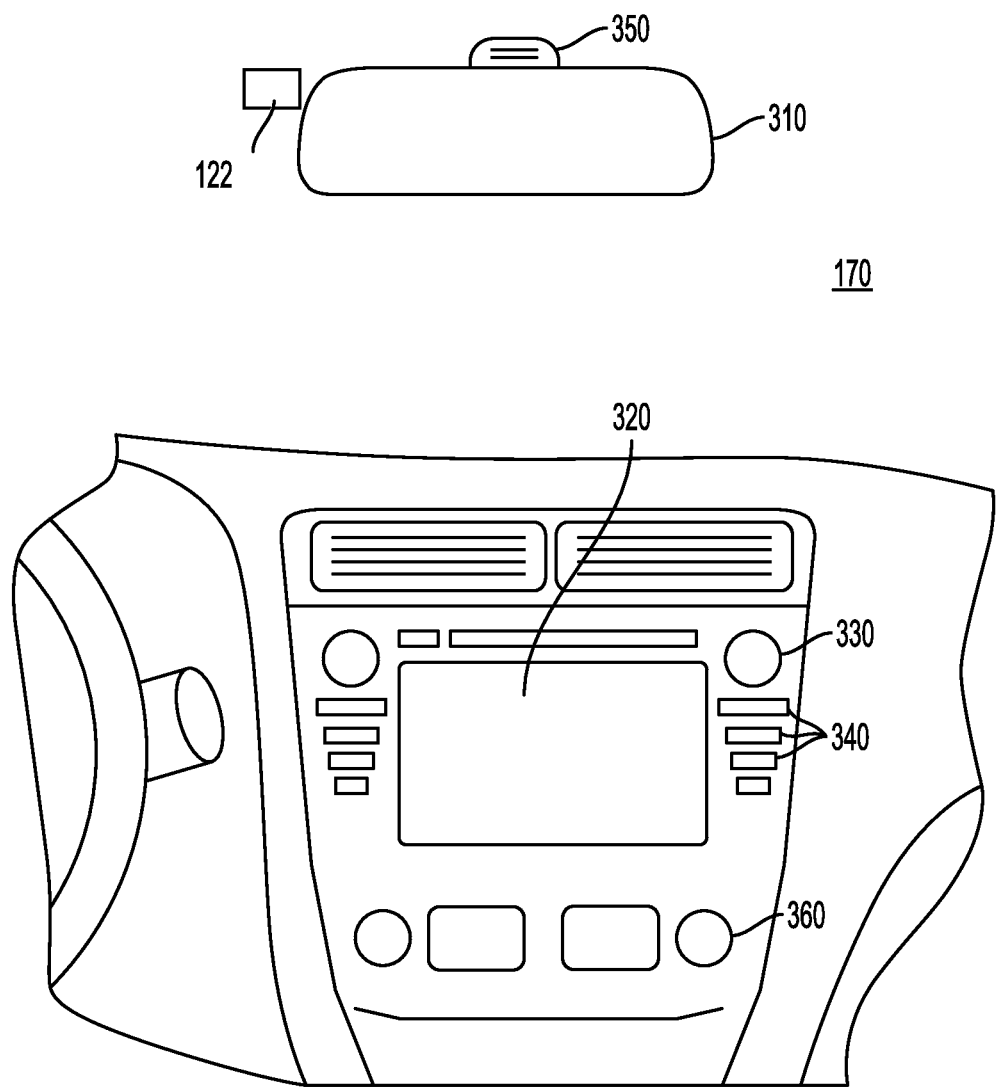
FIG. 3 is a diagrammatic representation of an interior of a vehicle including a rearview mirror and a user interface for a vehicle imaging system consistent with the disclosed embodiments.

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Multi-Imaging System

As discussed above, system 100 may provide drive assist functionality or semi or fully autonomous driving functionality that uses a single or a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three-camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, one or more of image capture devices 122-126 may be mounted behind glare shield that is flush with the windshield of vehicle 200. Such shielding may act to minimize the impact of any reflections from inside the vehicle on image capture devices 122-126.

In another embodiment, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three-camera system may provide certain performance characteristics. For example, some embodiments may include an ability to validate the detection of objects by one camera based on detection results from another camera. In the three-camera configuration discussed above, processing unit 110 may include, for example, three processing devices (e.g., three EyeQ series of processor chips, as discussed above), with each processing device dedicated to processing images captured by one or more of image capture devices 122-126.

In a three-camera system, a first processing device may receive images from both the main camera and the narrow field of view camera, and perform processing of the narrow FOV camera or even a cropped FOV of the camera. In some embodiments, the first processing device can be configured to use a trained system (e.g., a trained neural network) to detect objects and/or road features (commonly referred to as "road objects"), predict a vehicle's path, etc. ahead of a current location of a vehicle.

The first processing device can be further adapted to preform image processing tasks, for example, which can be intended to detect other vehicles, pedestrians, lane marks, traffic signs, traffic lights, and other road objects. Still further, the first processing device may calculate a disparity of pixels between the images from the main camera and the narrow camera and create a 3D reconstruction of the environment of vehicle 200. The first processing device may then combine the 3D reconstruction with 3D map data (e.g., a depth map) or with 3D information calculated based on information from another camera. In some embodiments, the first processing device can be configured to use the trained system on depth information (for example the 3D map data), in accordance with examples of the presently disclosed subject matter. In this implementation the system can be trained on depth information, such as 3D map data.

The second processing device may receive images from main camera and can be configured to perform vision processing to detect other vehicles, pedestrians, lane marks, traffic signs, traffic lights, road barriers, debris and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion-based 3D reconstruction to the first processing device to be combined with the stereo 3D images or with the depth information obtained by stereo processing.

The third processing device may receive images from the wide FOV camera and process the images to detect vehicles, pedestrians, lane marks, traffic signs, traffic lights, and other road objects. The third processing device may execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

As will be appreciated by a person skilled in the art having the benefit of this disclosure, numerous variations and/or modifications can be made to the foregoing disclosed examples. For example, not all components are essential for the operation of system 100. Further, any component can be located in any appropriate part of system 100 and the components can be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 or alert a user of the vehicle in response to the analysis.

As discussed below in further detail and according to examples of the presently disclosed subject matter, system 100 may provide a variety of features related to autonomous driving, semi-autonomous driving, and/or driver assist technology. For example, system 100 can analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 can analyze the collected data to determine whether or not vehicle 200 should take a certain action, and then automatically take the determined action without human intervention or it can provide a warning, alert or instruction which can indicate to a driver that a certain action needs to be taken. Automatic actions can be carried out under human supervision and can be subject to human intervention and/or override. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 can analyze the collected data and issue warnings and/or alerts to vehicle occupants based on the analysis of the collected data.

There is provided a system, method and computer readable medium (that is non-transitory) that may store a combination of one or more safety mechanisms and a Linux OS. The Linux OS may be a modified Linux OS that may include at least a part of at least the one or more safety mechanisms and/or may include other modifications that will guarantee at least the second safety level.

The one or more safety mechanisms may be of a first safety level (for example ASIL-B compliant) that is higher than a second safety level (for example ASIL QM) of the Linux OS.

In the following text the first safety level is assumed to be ASIL-B and the second safety level is ASIL QM. These are merely examples of first and second safety levels.

The one or more safety mechanisms guarantee that the safety requirements of the first safety level will be maintained—despite the usage of the Linux OS. For example—the one or more safety mechanisms may guarantee that the Linux OS, and/or applications that run on top of the Linux OS will not breach the security requirements of the first safety level.

Accordingly—ASIL decomposition may be used in order to achieve the first safety level integrity for the Linux OS.

The one or more safety mechanisms may be developed according to the requirements outlined in ISO 26262:2011 part 6, and hence be of the first safety level (for example exhibit ASIL-B integrity).

The Linux OS may be tested and/or amended to comply with the second safety level (for example may exhibit at least ASIL QM integrity) by identifying Linux OS core subsystems, writing requirements for them, developing tests for these requirements and executing the tests. Code coverage of these requirements can be measured to assure that a sufficient level of coverage is obtained.

The one or more safety mechanisms are developed based on failure mode analysis done for Linux OS and will provide 100% coverage for all domains defined in ISO 26262 standard.

The one or more safety mechanisms are tested with 100% coverage, including a fault injection campaign. Safety mechanisms, as discussed herein, refer to the use of hypercalls, intermediary platforms (e.g., hypervisors), or other processes that are validated to comply with a certain safety level (e.g., ASIL-B). The safety mechanisms may refer to a specific process or procedure that implements hypercalls to ensure the required safety level. Safety mechanisms are implemented through the use of hardware configured by software, software libraries, communication networks, processor-based components, and other elements.

Safety mechanisms may be implemented by revising portions of an operating system's kernel code to comply with safety requirements. As discussed further below, kernel code that traps system calls may be modified to invoke a hypervisor through the use of a hypercall. A hypercall is analogous to a syscall, where a hypercall is call to a hypervisor that is invoked by an operating system kernel and a syscall is a call to an operating system kernel that is invoked by a user application space process. In other words, a hypercall is a software trap from a domain to the hypervisor, just as a syscall is a software trap from an application to the kernel. Domains may use hypercalls to request privileged operations like updating page tables. Like a syscall, the hypercall is synchronous, but the return path from the hypervisor to the domain uses event channels. An event channel is a queue of asynchronous notifications. The notifications may provide a software interrupt. When a domain with pending events in its queue is scheduled, the operating system event callback handler is called to take appropriate action. Use of hypercalls provides a controlled interface from a non-validated kernel domain to a safety level compliant hypervisor.

Isolating memory functions from the operating system with the use of hypervisor hypercalls provides a level of safety requirements that satisfy a higher safety level, such as ASIL-B. The hypervisor and related hypercalls may be validated to ensure that external actors, such as operating systems, user-space applications, and other calling programs, act according to the safety requirements.

The following examples refer to safety requirements of the first safety level that are related to the memory domain and should be maintained:

A. Need to prevent interferences in the memory domain,
B. Need to maintain data integrity of memory,
C. Need to guarantee timing and execution,
D. Need to maintain a proper resource management, and
E. Need to maintain a proper exchange of information.

Each of these safety requirements are discussed in further detail here.

A. Need to Prevent Interferences in the Memory Domain

Interference may occur when a software element accesses or modifies code or data belonging to another software element. This type of interference is related to corruption of memory content and device configuration data.

A memory domain interference safety mechanism is provided that will prevent the interference in the memory domain. The memory domain interference safety mechanism may manage accesses to the memory domain and enforce access rules that will prevent a software element from performing an unauthorized access to (or just an unauthorized modifying of) data or code belonging to another process (e.g. other executing software).

Example—Page Table Protection

A page table is the data structure used by a virtual memory system in a computer operating system to store the mapping between virtual memory addresses and physical memory addresses.

A failure may occur when an erroneous kernel write corrupts virtual memory page tables of an application.

The memory domain interference safety mechanism may include:
1. Mapping the page tables to a read only memory area.
2. Replacing a kernel function (e.g., of the Linux OS) that updates page tables with a hypercall. Here, the hypercall is a software trap from a domain to the hypervisor, as described above. This may include modifying a set_pte( ) implementation—the function that updates the page table entry—in the kernel to invoke the hypercall (hypervisor function) h_set_pte( ).
3. Implementing the update page table hypercall in a Secure Execution Environment (SEE) that is, for example, ASIL-B validated. This may include updating the page table entries using the hypercall h_set_pte( ).

As a result of the above safety mechanism, any kernel bug that attempts to generate a write address that apply to the memory area where the page tables reside will be blocked. Only "legal" writes are allowed, via the SEE hypercall.

The memory domain interference safety mechanism may be used for allocation of memory from user space. This mechanism may include:
1. User space application requests memory from the kernel.
2. The kernel uses its internal dynamic memory management logic to allocate memory pages for the application.
3. The kernel invokes h_set_pte( ) hypercall in order to update the page table of the application.
4. The hypervisor updates the page table entries of the application.

B. Need to Maintain Data Integrity of Memory

Data integrity may include maintaining the completeness and correctness of dynamic and static memory elements used by the application.

A memory integrity protection safety mechanism is provided and may maintain data integrity of memory. The memory integrity protection safety mechanism may monitor the completeness and correctness of dynamic and static memory elements to detect data integrity problems and if a memory integrity problem is found—it may amend it and/or may generate an appropriate alert or request aimed to correct the data integrity problem.

The memory integrity protection safety mechanism may prevent a Linux kernel from allocating overlapping regions of memory for different processes.

Execution paths in the Linux kernel that handle page allocation (the execution paths that are followed when malloc is called from user space) are either modified to invoke a call to the hypervisor to manage the page allocation or are tested to guarantee that these execution paths are first safety level compliant.

For example, the paths may be tested while providing 100% coverage and branch coverage statements for these paths, thereby providing high confidence that the memory allocation code will operate as expected and the chance of returning overlapping memory regions is virtually impossible.

C. Need to Guarantee Timing and Execution

There is a need to ensure correct and timely execution of safety critical applications, without blocking or interference from non-safety critical applications.

A timing and execution safety mechanism may be provided that may guarantee the timely execution of safety critical applications without blocking or interference from non-safety critical applications. For example, safety critical application may be granted higher priority access (e.g., higher than non-safety critical applications) to resources, such as supervisor or hypervisor, memory, or other ECU resources), to guarantee the timely execution of the safety critical applications.

D. Need to Maintain a Proper Resource Management

The Linux OS must ensure the proper resource allocation for safety critical applications. Thus, a resource allocation safety mechanism may be provided that may guarantee the proper resource management.

The kernel may not allocate the appropriate resources to a safety related application (resource may include memory, CPU time, or other system shared resources).

By implementing the Control Groups feature of the Linux kernel and using the namespace mechanism, proper resource allocation and isolation for safety critical applications.

The purpose of this safety mechanism is to create separation between safety and non-safety related applications with respect to resource allocation by the kernel may be ensured.

It is critical that enough resources will be allocated for the safety critical applications and that there will be no interference to this resource usage by non-safety critical applications.

Control Groups (Cgroups)—By supporting this capability, a higher level execution manager (or another, user space, supervisor application) is enabled to allocate all the safety related applications to a separate control group that will have guaranteed resource allocation from the kernel (resource may be CPU time, percentage of the overall memory of the system and other resources, as will be decided by the system designer).

By using the namespace feature, the system designer can isolate a system resource for a specific group of user space applications/processes and "hide" them from other user space applications or processes. This enables the system designer to create isolation of the resource between safety and non-safety critical applications. For example, by using the network namespace, the designer can create isolation of the network interface between safety and non-safety critical application.

E. Need to Maintain a Proper Exchange of Information

There is a need to prevent or overcome interferences in the exchange of information that may occur due to errors during exchange of information, such as: loss of information, delay of information, errors on the communication channel (blocking, hardware error, etc. . . . ).

An exchange of information safety mechanism may be provided that may guarantee the proper exchange of information. Such a safety mechanism may prevent errors that occur when data is exchanged between two entities. Data errors include data corruption and data loss.

To detect and prevent data corruption, data padding may be used in shared objects. Shared objects include, but are not limited to, shared memory, domain sockets, FIFO queues, or message queues. The kernel may corrupt shared objects which are used by the applications to exchange data. This may be done intentionally (e.g., in a malicious attack attempt) or inadvertently (e.g., electronic component malfunction or failure).

To address data corruption issues, an exchange of information safety mechanism may be provided that may pad shared data with padded bytes (error correction and/or error detection bytes) when the shared data is written to the shared object. The location of the added bytes may be adapted to the form of communication channel used. When the shared data is read, the reading process or application should check and remove the padding. If the padding is tampered with (changed or removed), the process or application should conclude that the data was corrupted and cannot be used.

Enqueuing and dequeuing operations to and from a queue, stack, or other message buffer may be performed using a hypercall to a hypervisor. For a kernel process to write shared data to a shared object, a hypercall may be invoked. To read shared data, the kernel process may invoke a hypercall to read from the shared object. Hypercalls may be used in combination with data padding. Alternatively, data padding may be used by itself to ensure data integrity between a sender and receiver (e.g., between a kernel process and a user application).

Another type of error involves data exchange and loss of signals. Signals generated by processes to other processes may not be received by the target processes (i.e., loss of signal). Signals include various message types, such as an event-based message, a process-to-process message, a broadcast message, a point-to-point message, or the like.

An exchange of information safety mechanism may be provided that, stores (in a buffer) of all the outbound and inbound signals to and from the safety related application. At each detection interval, the exchange of information safety mechanism checks the buffer and makes sure that all the outbound signals were received by the target process.

Safety mechanisms may also be implemented by using portions of kernel code, kernel debugging operations, or other modifications to operating system code. As a result, in an implementation, the exchange of information safety mechanism may be implemented using the kernel trace event subsystem in the Linux OS, in an embodiment. The kernel trace subsystem is a framework for tracing events that occur in the OS. A system developer may define events to be traced, create one or more code snippets to capture event information to a buffer, and create one or more other code snippets to process the captured event information. Events may be defined that correspond to certain messages or message types. Event handlers in the kernel trace subsystem then may capture event information, which relates to the message or message type sent or received, and store information in a trace log. The trace log may be audited to determine whether a message was received by a target process. When a target process receives a message, it may generate an event, which is captured by the event handler in the kernel trace subsystem. The trace log then contains a record of whether the message was delivered.

In another implementation, the exchange of information safety mechanism monitors a message buffer. The message buffer may be unique to a process. The message buffer may be a send or receive message buffer, or a send/receive message buffer. The message buffer may be shared among processes, such as a global message buffer for system-wide event messages. When a message is posted to the buffer by a sending process, the message is available for a receiving process to retrieve the posted message. If the message exists for longer than a threshold period, then it is considered orphaned—the message has not been received. The message buffer includes metadata about each message including, but not limited to the message sender, intended recipient, timestamp of when the message was sent, timestamp of when the message was placed in the buffer, timestamp of when the message was retrieved from the buffer (if the message is not expunged from the buffer when retrieved by the receiving process), a message priority, or other information. Using the timestamp information of when the message was initially sent or when the message was placed in the buffer, the exchange of information safety mechanism may determine that the message has existed in the buffer for longer than a threshold time and perform a remedial action. The remedial action may include notifying the sending process, notifying an application or process executing in user space, notifying a human administrator, or the like. Additional remedial actions may include quarantining the sending process, quarantining the intended recipient process, adding additional logging of communications between the two processes, or the like.

In another implementation, the exchange of information safety mechanism may interface with the sending and receiving processes. Each of the sending and receiving process may store and maintain logs of messages sent or received. The exchange of information safety mechanism may obtain some or all of the log information from the sender and receiver and compare the logs to determine whether a message that was sent was actually received. The exchange of information safety mechanism may request logs from a certain time period, such as for the previous 100 ms or some other period. This reduces the log information that needs to be analyzed to determine whether a message is lost. The exchange of information safety mechanism may also request log information of a specific message. Each message may be uniquely identified with a globally unique ID (GUID). The GUID may be used as a parameter to each of the sending and receiving process. The processes may then query their respective logs and return information about the message in question.

The detection interval is the time the system is allowed to have an un-detected fault (meaning, the system must detect the fault within this window). It is usually a very small interval (for some platforms it is 100 ms, in other platforms it is even lower). Threshold periods may be based on the detection interval so that if a message has not been received by the detection interval, the message is considered lost and a fault is raised.

Figure 4:
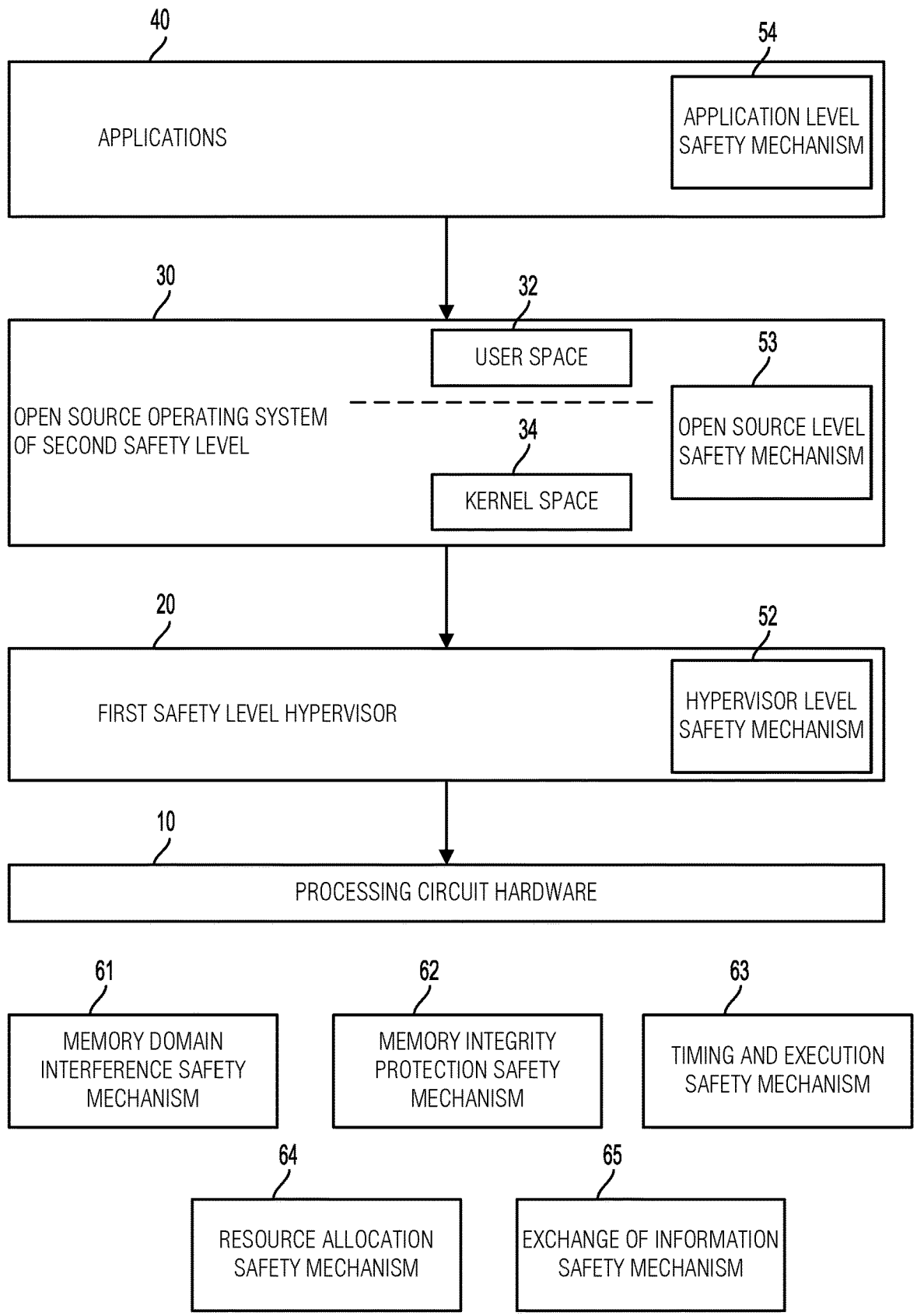
FIG. 4 illustrates a processing circuit hardware, an operating system and other components.

FIG. 4 illustrates a processing circuit hardware 10 that may execute a first safety level hypervisor 20, an open source operating system 30 (such as Linux OS) that is of a second safety level (such as QM ASIL) that is lower than the first safety level, and applications 40 that run on top of the open source operating system 30.

One or more safety mechanisms may be implemented in one or more of first safety level hypervisor 20, open source operating system 30, and applications 40.

The open source operating system 30 may include a user space 32 and a kernel space 34. A safety mechanism may be located in one or both spaces.

Code that runs in the user space 32 may include platform support code (e.g. user space drivers), system management agents, etc.

Code that runs in the kernel space 34 may include kernel space drivers and different kernel modules or sub systems (e.g. memory management), or SW agent running in kernel mode.

Communication between user space 32 and kernel space 34 components can be done via standard POSIX interfaces. Communication between kernel space 34 and the first safety level hypervisor 20 can be done under the control of one or more safety mechanisms.

FIG. 4 illustrates an application level safety mechanism 54, an open source level safety mechanism 53, and hypervisor level safety mechanism 52.

A safety level mechanism may be included in multiple levels, for instance, one mechanism may operate at both the OS and application levels.

The safety mechanisms may also be classified based on their functionality—not only based on their location. FIG. 4 illustrates a memory domain interface safety mechanism 61, a memory integrity protection safety mechanism 62, a timing and execution safety mechanism 63, a resource allocation safety mechanism 64, and an exchange of information safety mechanism 65. One or all of these mechanisms may operate on one or more levels (application, OS, or hypervisor).

A safety mechanism may control and/or execute operations that may cause safety breaches.

A safety mechanism may be implemented using software or specially configured hardware. Safety mechanisms provide an interface between processes, signaling, and hardware resources (e.g., memory or CPU). Safety mechanisms may be partially implemented in hardware and partially implemented in software.

Figure 5:
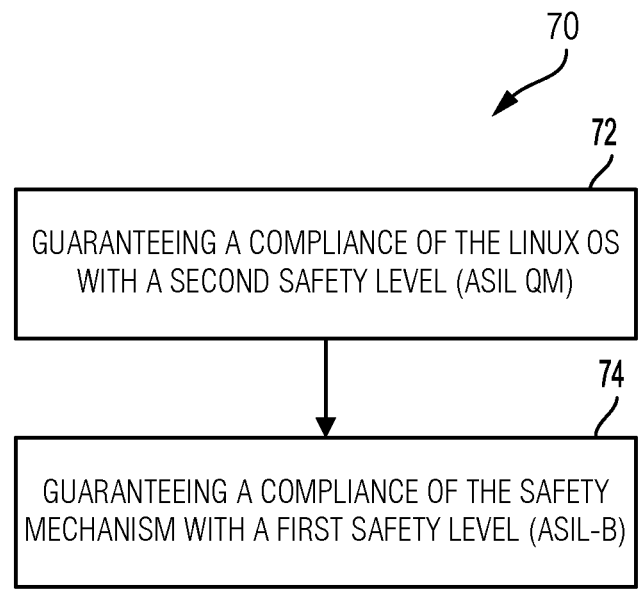
FIG. 5 illustrates a method of providing a combination of a Linux OS and a safety mechanism that together are ASIL-B compliant.

FIG. 5 illustrates a method 70 of providing a combination of a Linux OS and a safety mechanism that together are ASIL-B compliant.

Method 70 starts by step 72 of guaranteeing a compliance of the Linux OS with the ASIL QM. This is done, for example, by developing the process artifacts required by ISO 26262: Design, specification, requirements, tests and test results) for the Linux OS.

Step 72 may be followed by step 74 of guaranteeing a compliance of the safety mechanisms with the ASIL-B.

Figure 6:
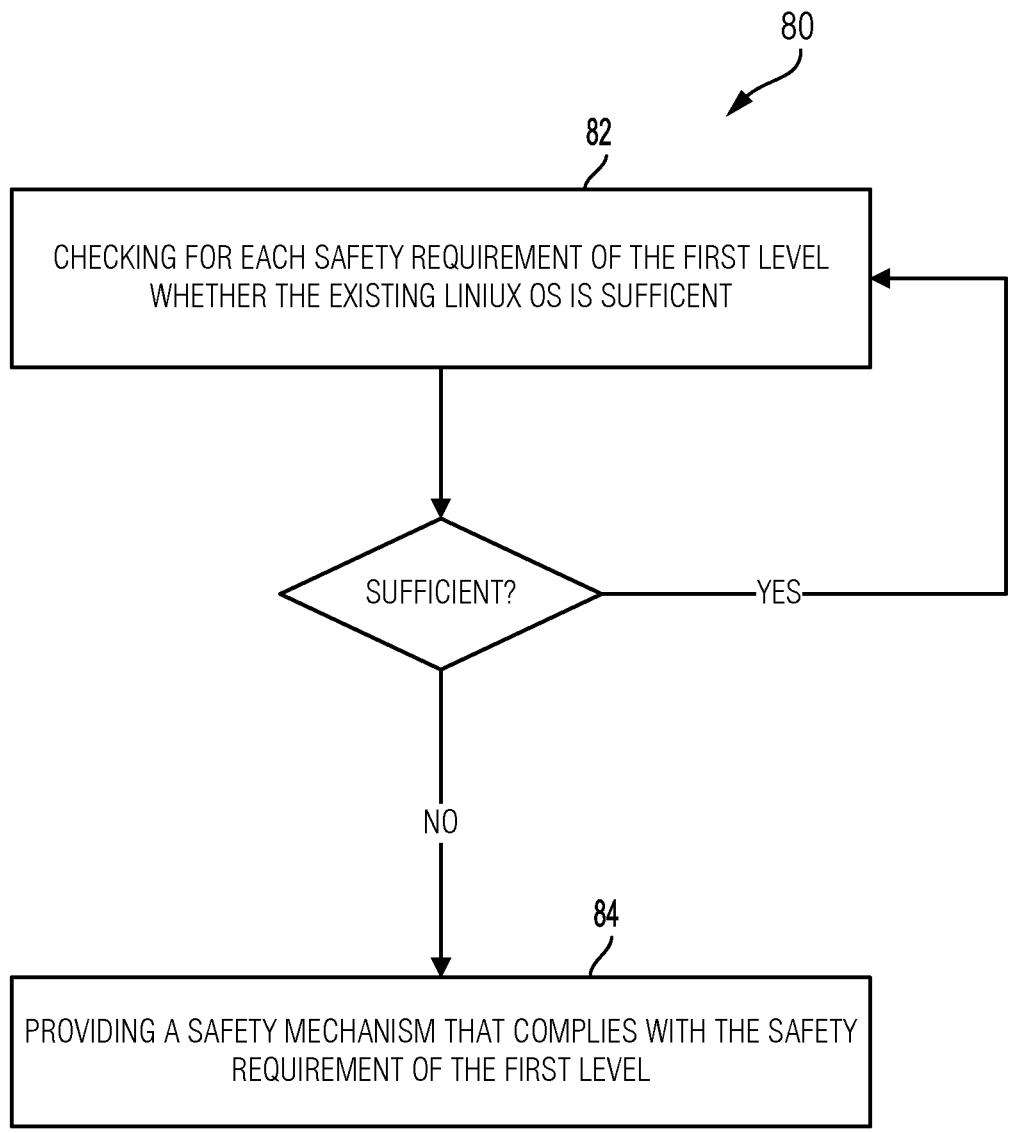
FIG. 6 illustrates a method of providing a combination of a Linux OS and a safety mechanism that together are ASIL-B compliant.

FIG. 6 illustrates a method 80 of providing a combination of a Linux OS and a safety mechanism that together are ASIL-B compliant.

In order to comply with ASIL-B safety requirements method 80 checks for each safety requirement whether the existing Linux OS is sufficient (step 82)—whether the safety requirement is fulfilled when using the existing Linux OS. If the check results in "YES", then another safety requirement is checked. If the check results in "NO", then a safety mechanism that complies with the safety requirement is provided (step 84).

Figure 7:
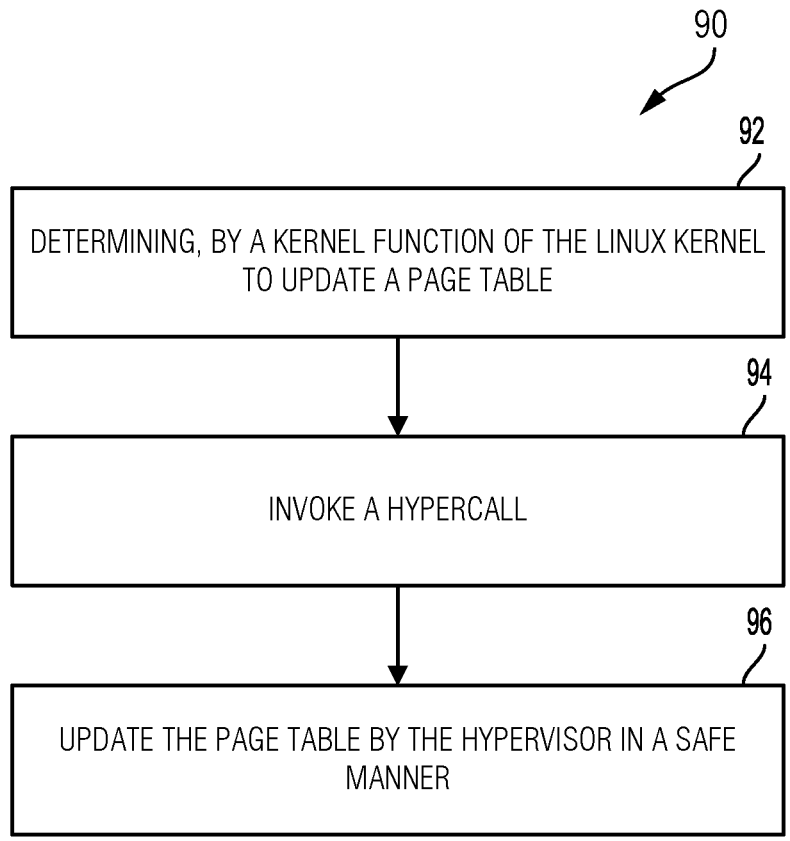
FIG. 7 illustrates a method of a page table safety mechanism.

FIG. 7 illustrates a method 90 of a page table safety mechanism.

Method 90 starts at step 92 by determining, by a kernel function of the Linux Kernel to update a page table.

Step 92 may be followed by step 94 of invoking a hypercall.

The invoking of the hypercall causes the hypervisor to update the page table in a safe manner (step 96).

Figure 8:
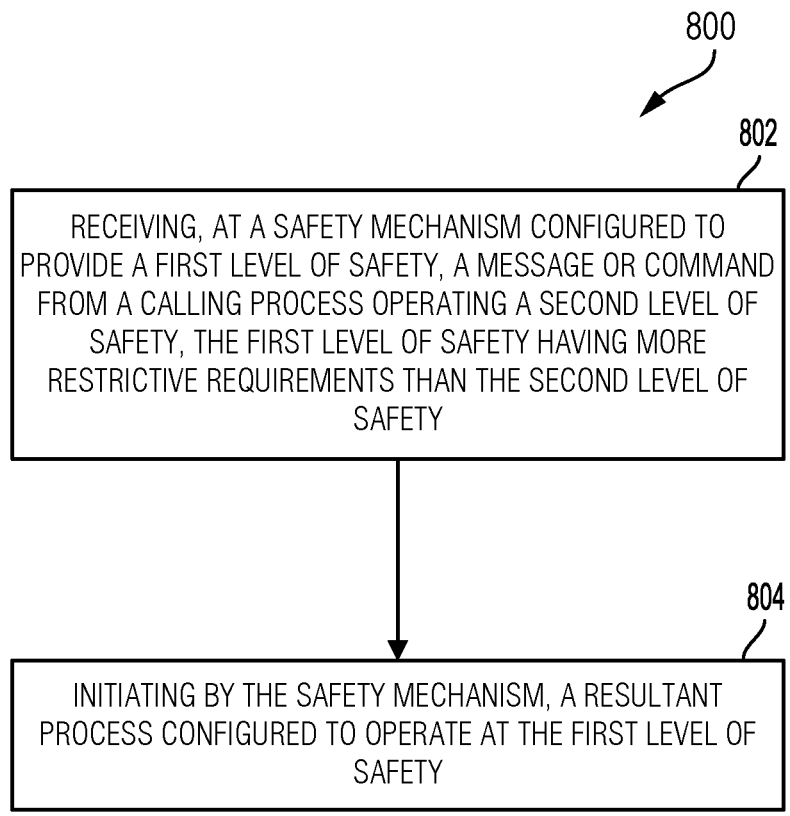
FIG. 8 illustrates a method of implementing safety mechanisms in a safety-critical system.

FIG. 8 illustrates a method 800 for implementing safety mechanisms in a safety-critical system. A safety-critical system is one that executes one or more safety critical applications and whose failure or malfunction may result in drastic outcomes, including for example, a vehicle malfunction resulting in human death. Safety-critical systems and applications may be tested using various methods to determine reliability, failure rates, operation under different failure conditions, and the like. To validate a safety-critical system, extensive inspection, testing, verification, and analysis is performed to ensure that systems and applications are error-free. As discussed above, safety requirements may be promulgated by a standards group, such as the International Organization for Standardization (ISO). The safety standard for autonomous vehicle operation is ASIL (Automotive Safety Integrity Level). To be ASIL compliant, components of the safety-critical system must comply with the safety requirements outlined in the corresponding ASIL standard. Thus, a safety-critical system is one that is designed to be highly reliable and comply with safety standards.

Step 802 includes receiving, at a safety mechanism configured to provide a first level of safety, a message or command from a calling process operating at second level of safety, the first level of safety having more restrictive requirements than the second level of safety. In an embodiment, the first level of safety is ASIL-B. In an embodiment, the second level of safety is ASIL QM.

In an embodiment, the calling process operating at the second level of safety is an operating system process. In a related embodiment, the calling process operating at the second level of safety is an open source operating system process.

In an embodiment, the safety mechanism is configured to execute in user space. In another embodiment, the safety mechanism is configured to execute in kernel space. In yet another embodiment, the safety mechanism is configured to execute in a hypervisor.

Step 804 includes initiating by the safety mechanism, a resultant process based on the message or command, the resultant process configured to operate at the first level of safety. The resultant process may be a hypercall, in various embodiments.

In an embodiment, the command is a memory operation, and wherein initiating the resultant process comprises initiating a corresponding memory operation on behalf of the calling process operating at the second level of safety. In a further embodiment, the memory operation includes a page table update, and wherein the resultant process is a hypercall to execute the page table update. In a related embodiment, the memory operation includes a memory allocation operation, and wherein the resultant process is configured to: analyze the boundaries of the memory allocation operation to determine whether memory allocated would overlap existing memory allocations, and alert the calling process that the memory allocation operation would violate memory protection constraints, or cause the memory allocation operation to allocate non-overlapping memory segments.

In an embodiment, the command is a request for shared resources, and wherein the resultant process is to manage timing, execution, or availability of the shared resources. In a further embodiment, the calling process is associated with a priority level or an application type, and wherein the timing, execution, or availability of the shared resources is based on the priority level or application type. In a related embodiment, the shared resources include processing resources or memory resources. In a further embodiment, the calling process is associated with a control group that has a priority level used to manage timing, execution, or availability of the shared resources. In a related embodiment, the calling process is associated with a namespace that has a priority level used to manage timing, execution, or availability of the shared resources.

In an embodiment, the message is an inter-process message, and wherein initiating the resultant process comprises adding data padding to the message. In a further embodiment, the data padding is used to identify data integrity issues with the message after it is received.

In an embodiment, the message is an inter-process message, and wherein initiating the resultant process comprises enqueuing the message to a message buffer. In a further embodiment, the method 800 includes monitoring the message buffer to determine whether the message is ever delivered. In a related embodiment, monitoring the message buffer comprises: analyzing the message to determine a timestamp of when the message was created or written to the message buffer, obtaining a current time; and determining whether a threshold period has elapsed based on the difference between the timestamp and the current time.

In an embodiment, initiating the resultant process comprises monitoring a message buffer to determine whether the message is ever received. In a further embodiment, monitoring the message buffer comprises: analyzing the message to determine a timestamp of when the message was created or written to the message buffer; obtaining a current time; and determining whether a threshold period has elapsed based on the difference between the timestamp and the current time.

In a related embodiment, the monitoring is performed at a detection interval. In a further embodiment, the threshold period is equal to the detection interval.

In an embodiment, initiating the resultant process comprises: querying the calling process to identify a sent message; querying a receiving process to identify received messages; and determining whether the sent message was ever received by analyzing the received messages for the sent message.

Any reference to a system should be applied, mutatis mutandis to a method that is executed by a system and/or to a computer program product that stores instructions that once executed by the system will cause the system to execute the method. The computer program product is non-transitory and may be, for example, an integrated circuit, a magnetic memory, an optical memory, a disk, and the like.

Any reference to method should be applied, mutatis mutandis to a system that is configured to execute the method and/or to a computer program product that stores instructions that once executed by the system will cause the system to execute the method.

Any reference to a computer program product should be applied, mutatis mutandis to a method that is executed by a system and/or a system that is configured to execute the instructions stored in the computer program product.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system that is illustrated in any of the figures and/or specification and/or the claims may be provided.

Any combination of any system illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

We claim:

1. A method of implementing safety mechanisms in a safety-critical system, the method comprising:

receiving, at a safety mechanism configured to provide a first level of safety, a message or command from a calling process operating at second level of safety, the first level of safety having more restrictive requirements than the second level of safety; and initiating by the safety mechanism, a resultant process based on the message or command, the resultant process configured to operate at the first level of safety, wherein the command is a memory operation, and wherein initiating the resultant process comprises initiating a corresponding memory operation on behalf of the calling process operating at the second level of safety, wherein the memory operation includes a page table update, and wherein the resultant process is a hypercall to execute the page table update.

2. The method of claim 1, wherein the first level of safety is ASIL-B.

3. The method of claim 1, wherein the second level of safety is ASIL QM.

4. The method of claim 1, wherein the calling process operating at the second level of safety is an open source operating system kernel function.

5. The method of claim 1, wherein the calling process operating at the second level of safety is an open source operating system process for a page table update.

6. The method of claim 1, wherein initiating the resultant process comprises monitoring a message buffer to determine whether the message is ever received.

7. The method of claim 6, wherein the monitoring is performed at a detection interval.

8. The method of claim 7, wherein a threshold period is equal to the detection interval.

9. A method of implementing safety mechanisms in a safety-critical system, the method comprising:

receiving, at a safety mechanism configured to provide a first level of safety, a message or command from a calling process operating at second level of safety, the first level of safety having more restrictive requirements than the second level of safety; and initiating by the safety mechanism, a resultant process based on the message or command, the resultant process configured to operate at the first level of safety, wherein the command is a memory operation, and wherein initiating the resultant process comprises initiating a corresponding memory operation on behalf of the calling process operating at the second level of safety, wherein the memory operation includes a memory allocation operation, and wherein the resultant process is configured to:

analyze boundaries of the memory allocation operation to determine whether memory allocated would overlap existing memory allocations; and alert the calling process that the memory allocation operation would violate memory protection constraints, or cause the memory allocation operation to allocate non-overlapping memory segments.

10. The method according to claim 9, wherein the calling process operating at the second level of safety is an open source operating system kernel function for allocating regions of memory to different processes.

11. The method of claim 9, wherein the calling process operating at the second level of safety is an open source operating system process.

12. The method of claim 9, wherein the first level of safety is ASIL-B and wherein the second level of safety is ASIL QM.

13. A method of implementing safety mechanisms in a safety-critical system, the method comprising:
  receiving, at a safety mechanism configured to provide a first level of safety, a message or command from a calling process operating at second level of safety, the first level of safety having more restrictive requirements than the second level of safety;
  initiating by the safety mechanism, a resultant process based on the message or command, the resultant process configured to operate at the first level of safety, wherein the message is an inter-process message, and wherein initiating the resultant process comprises enqueuing the message to a message buffer; and
  monitoring the message buffer to determine whether the message is ever delivered, wherein monitoring the message buffer comprises:
    analyzing the message to determine a timestamp of when the message was created or written to the message buffer;
    obtaining a current time; and
    determining whether a threshold period has elapsed based on the difference between the timestamp and the current time.

14. The method according to claim 13, wherein the initiating the resultant process further comprises adding data padding to the message.

15. The method according to claim 14, wherein the data padding is used to identify data integrity issues with the message after it is received.

16. The method of claim 13, wherein the first level of safety is ASIL-B and wherein the second level of safety is ASIL QM.

17. A method of implementing safety mechanisms in a safety-critical system, the method comprising:
  receiving, at a safety mechanism configured to provide a first level of safety, a message or command from a calling process operating at second level of safety, the first level of safety having more restrictive requirements than the second level of safety; and
  initiating by the safety mechanism, a resultant process based on the message or command, the resultant process configured to operate at the first level of safety, wherein initiating the resultant process comprises monitoring a message buffer to determine whether the message is ever received, wherein monitoring the message buffer comprises:
    analyzing the message to determine a timestamp of when the message was created or written to the message buffer;
    obtaining a current time; and
    determining whether a threshold period has elapsed based on the difference between the timestamp and the current time.

18. The method according to claim 17, wherein the initiating the resultant process further comprises adding data padding to the message.

19. The method according to claim 18, wherein the data padding is used to identify data integrity issues with the message after it is received.

20. A method of implementing safety mechanisms in a safety-critical system, the method comprising:
  receiving, at a safety mechanism configured to provide a first level of safety, a message or command from a calling process operating at second level of safety, the first level of safety having more restrictive requirements than the second level of safety; and
  initiating by the safety mechanism, a resultant process based on the message or command, the resultant process configured to operate at the first level of safety, wherein initiating the resultant process comprises:
    querying the calling process to identify a sent message;
    querying a receiving process to identify received messages; and
    determining whether the sent message was ever received by analyzing the received messages for the sent message.

* * * * *